US012066549B1

(12) United States Patent
Xie et al.

(10) Patent No.: US 12,066,549 B1
(45) Date of Patent: Aug. 20, 2024

(54) SAME-PATH AND SYNCHRONOUS DETECTION SYSTEM AND METHOD FOR ATMOSPHERE DATA

(71) Applicant: Hefei Institutes of Physical Science, Chinese Academy of Sciences, Hefei (CN)

(72) Inventors: Chenbo Xie, Hefei (CN); Yalin Hu, Hefei (CN); Hui Zhou, Hefei (CN); Hao Yang, Hefei (CN); Liangliang Cheng, Hefei (CN); Wenyue Zhu, Hefei (CN); Yingjian Wang, Hefei (CN)

(73) Assignee: Hefel Institutes of Physical Science, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/652,664

(22) Filed: May 1, 2024

Related U.S. Application Data

(63) Continuation of application No. PCT/CN2023/140617, filed on Dec. 21, 2023.

(30) Foreign Application Priority Data

Aug. 8, 2023 (CN) .......................... 202310988646.4

(51) Int. Cl.
*G01S 17/00* (2020.01)
*G01S 7/481* (2006.01)
(Continued)

(52) U.S. Cl.
CPC ............ *G01S 17/95* (2013.01); *G01S 7/4815* (2013.01); *G01S 7/4816* (2013.01); *G01S 7/4817* (2013.01); *G01S 17/58* (2013.01)

(58) Field of Classification Search
USPC .......................................................... 356/28
See application file for complete search history.

(56) References Cited

U.S. PATENT DOCUMENTS 7,631,839 B1 * 12/2009 Duncan .................. G02B 27/58
359/399
2012/0050750 A1 * 3/2012 Hays ........................ G01P 5/26
356/519
(Continued)

FOREIGN PATENT DOCUMENTS

CN 102422179 A * 4/2012 ........... G01K 11/006
CN 103267969 A 8/2013
(Continued)

OTHER PUBLICATIONS

First Office Action issued in counterpart Chinese Patent Application No. 202310988646.4, dated Sep. 18, 2023.
(Continued)

*Primary Examiner* — James R Hulka
(74) *Attorney, Agent, or Firm* — Westbridge IP LLC (57) ABSTRACT

Disclosed are a same-path and synchronous detection system and a same-path and synchronous detection method for atmosphere data. The detection system includes an emission unit, a receiving unit and a data processing unit, where the emission unit includes multiple sets of laser devices, which are used for emitting the laser of different wavelengths in a synchronous and same-path manner; the receiving unit includes a receiving telescope, which is symmetrically provided with a plurality of pupils, to receive an echo signal after the laser of different wavelengths interacts with the atmosphere; and the data processing unit is configured to calculate atmosphere data parameters through the echo signal. The synchronous and same-path detection for a
(Continued)

plurality of atmosphere data parameters may be implemented in the present disclosure.

8 Claims, 3 Drawing Sheets

(51) Int. Cl.
*G01S 17/58* (2006.01)
*G01S 17/95* (2006.01)

(56) References Cited

U.S. PATENT DOCUMENTS

| | | | | |
|---|---|---|---|---|
| 2012/0169053 | A1* | 7/2012 | Tchoryk, Jr. | G01S 7/491 |
| | | | | 356/28 |
| 2012/0274937 | A1* | 11/2012 | Hays | G01S 17/95 |
| | | | | 356/450 |
| 2013/0314694 | A1* | 11/2013 | Tchoryk, Jr. | G01S 17/58 |
| | | | | 356/28.5 |

FOREIGN PATENT DOCUMENTS

| | | |
|---|---|---|
| CN | 104776825 A | 7/2015 |
| CN | 106769931 A | 5/2017 |
| CN | 109283550 A | 1/2019 |
| CN | 111024245 A | 4/2020 |
| CN | 114910883 A | 8/2022 |
| CN | 116736336 A | 9/2023 |
| KR | 101435584 B1 | 9/2014 |
| KR | 20160135936 A | 11/2016 |

OTHER PUBLICATIONS

Notification to Grant Patent Right for Invention issued in counterpart Chinese Patent Application No. 202310988646.4, dated Oct. 25, 2023.

Yang et al., Study about atmosphere extinction coefficient based on 1064nm Mie-scattering lidar, Journal of China University of Metrology, 2006, 30(2), pp. 170-173, dated Apr. 28, 2006.

\* cited by examiner

SAME-PATH AND SYNCHRONOUS DETECTION SYSTEM AND METHOD FOR ATMOSPHERE DATA

CROSS-REFERENCE TO RELATED APPLICATIONS

This application is a continuation of International Application No. PCT/CN2023/140617, filed on Dec. 21, 2023, which claims priority to Chinese Patent Application No. 202310988646.4, filed on Aug. 8, 2023. All of the aforementioned applications are incorporated herein by reference in their entireties.

TECHNICAL FIELD

The present disclosure belongs to the technical field of LiDAR, and particularly relates to a same-path and synchronous detection system and a same-path and synchronous detection method for atmosphere data.

BACKGROUND

The atmospheric multi-parameter comprehensive detection is of great significance in aspects of laser atmospheric transmission, environmental monitoring, aerospace and the like. During the laser atmospheric transmission, an atmospheric transmittance represents a laser energy attenuation, an atmospheric turbulence affects a phase distribution, a light intensity fluctuation, a light-beam shift and other situations of the laser in spatial light, and an atmospheric wind field affects the distribution of media in the space, which has a great influence on the thermal blooming in the nonlinear optical field. These three parameters also affect each other and act on the laser transmission process in the atmosphere together, and therefore the comprehensive detection for the atmospheric transmittance, the atmospheric turbulence characteristics and the atmospheric wind field is more important.

With the characteristics of high temporal-spatial resolution as well as real-time and continuous measurement, the LiDAR may achieve the detection for an individually formulated path, and the application thereof in the aspect of atmospheric detection has been widely concerned.

When the LiDAR detects the atmospheric transmittance, by receiving a back echo scattering signal, atmospheric transmittance information is obtained through data acquisition and inversion. The LiDAR may measure a vertical extinction contour, while a slant path is rarely used to measure the atmospheric transmittance.

For the wind field detection, the LiDAR may detect a wind velocity, explore a turbulence, measure the wind field in real time and the like by measuring back scattering of a small number of particles naturally occurring in the atmosphere, and usually there are two detection mechanisms, including direct wind detection system and coherent Doppler wind detection system. The direct wind detection system may detect the atmospheric wind field above a troposphere and a stratosphere, but a high-energy laser device is required and subjected to frequency stabilization, a transmittance curve is scanned through a frequency detector to obtain a Doppler frequency shift, a subsequent optical path is more complex, and a system volume is relatively great. Benefiting from the upgrading of all-fiber communication and related products thereof, a coherent Doppler wind LiDAR system is compact in structure, stable and convenient for integrated design.

An atmospheric coherence length can not only represent the turbulence intensity information, but also represent the turbulence phase fluctuation, therefore accurately obtaining the atmospheric coherence length to represent the atmospheric turbulence characteristics is very important. To achieve the detection for the atmospheric coherence length at the formulated path, the LiDAR emits the laser actively and focuses to form a Rayleigh beacon, the beacon is imaged in an optical system, and the atmospheric coherence length is inverted through a centroid jitter variance of two light spots. When researching an optical transfer function, Fried established a relationship between the atmospheric coherence length and an atmospheric refractive index structure constant under a weak fluctuation condition. The traditional turbulence LiDAR performs detection vertically, and the beacon of different heights needs to be focused to acquire $r_0$ of different heights, which is relatively difficult.

Currently, the method for implementing the detection for the above various atmospheric parameters (the atmospheric transmittance, turbulence characteristics and wind field) usually adopts multiple sets of LiDAR of different types to perform simultaneous detection, but the multiple sets of laser devices, telescopes and signal detection devices need to be operated at the same time, which leads to a low running reliability due to the complex technology and great detection difficulty. Multiple sets of LiDAR systems cannot achieve the synchronous emission of laser, and a plurality of laser beams will generate a certain deviation in space, causing inconsistent echo signals of the multiple sets of LiDAR in time and space, and therefore the simultaneous and same-path detection for the atmospheric transmittance, turbulence characteristics and wind field cannot be implemented.

SUMMARY

For the foregoing issue, the present disclosure provides a same-path and synchronous detection system for atmosphere data, and the detection system includes an emission unit, a receiving unit and a data processing unit; the emission unit includes multiple sets of laser devices, which are used for emitting the laser of different wavelengths in a synchronous and same-path manner; the receiving unit includes a receiving telescope, which is symmetrically provided with a plurality of pupils, to receive an echo signal after the laser of different wavelengths interacts with the atmosphere; and the data processing unit is configured to calculate atmosphere data parameters through the echo signal.

Further, the laser devices include a first laser device and a second laser device; the first laser device is fixed above the receiving telescope, to emit lasers of a first fundamental frequency of a first setting wavelength and a corresponding doubled frequency in a synchronous and same-path manner, and a front end of the first laser device is sequentially provided with a total reflector and a beam expander; and the whole second laser device is mounted below the receiving telescope, to emit the laser of a second fundamental frequency of a second setting wavelength with the first laser device in a synchronous and collimation manner.

Further, an emitting optical path of the second laser device adopts an off-axis emission and is the same as a receiving optical path, and an emergent laser keeps parallel to an optical axis of the receiving telescope.

Further, the emergent laser of the first fundamental frequency is emitted in a beam-expanding and collimation manner; and the emergent laser of the corresponding doubled-frequency laser is emitted in a beam-expanding and focusing manner.

Further, the whole receiving unit is a Cassegrain reflective structure, which is provided with an upper pupil, a lower pupil, a left pupil and a right pupil in upper, lower, left and right directions, and the spacing between very two pupils is greater than twice of the pupil diameter.

Further, a left emergent hole and a right emergent hole are correspondingly provided on left and right sides of the plane where the four pupils are located, the left emergent hole emits the emergent laser of the first fundamental frequency while the right emergent hole emits the corresponding doubled-frequency laser, and the right emergent hole is provided on a midpoint line that is perpendicular to a connecting line of the left and right pupils.

Further, the data processing unit includes an atmospheric transmittance detection channel, an atmospheric coherence length detection channel and an atmospheric wind field detection channel; the atmospheric transmittance detection channel includes a first avalanche photo diode (APD) detector and a first data collector, the first APD detector is configured to convert a back scattering space optical signal, generated after the interaction of the first fundamental frequency laser with atmospheric molecules and aerosol particles, into an electrical signal, and the first data collector is configured to collect the electrical signal; the atmospheric coherence length detection channel includes a reflector, a second optical filter and a second intensified charge coupled device (ICCD) detector, the reflector and the second optical filter are configured to transmit the received echo signal to a target surface of the second ICCD detector, and the second ICCD detector is configured to convert the echo signal into a digital signal; and the atmospheric wind field detection channel includes a circulator, an optical fiber coupler, a balance detector and a second data collector, the circulator is configured to output the echo signal to the optical fiber coupler, the optical fiber coupler is configured to perform beam splitting after the echo signal is in beat frequency with another circuit of local oscillator light, the balance detector is configured to convert the optical signal into the electrical signal, and the second data collector is configured to convert the electrical signal into the digital signal.

Further, the detection system further includes a calculating unit; when receiving and processing the data output from the atmospheric transmittance detection channel, the calculating unit acquires the data collector to calculate the atmospheric transmittance; when receiving and processing the digital signal transmitted by the atmospheric coherence length detection channel, the calculating unit may implement the measurement for the atmospheric coherence length; and when receiving and processing the digital signal from the atmospheric wind field detection channel, the calculating unit calculates an output wind velocity by using a formula inversion after the digital signal obtains a signal power spectrum through a fast fourier transform (FFT).

Further, the detection system further includes a scanning platform and a control unit, the scanning platform includes a main control panel and a driver, the driver is configured to control scanning parameters of the emission unit and the receiving unit according to instructions of the main control panel, and the scanning parameters include an azimuth angle, a pitch angle, a speed and a step size; and the control unit is configured to trigger multiple sets of laser devices simultaneously to generate a laser pulse, and synchronously trigger the atmospheric transmittance detection channel, the atmospheric coherence length detection channel and the atmospheric wind field detection channel for synchronous and same-path data collection, storage and inversion.

Another embodiment of the present disclosure further provides a same-path and synchronous detection method for atmosphere data, and the detection method includes the following steps:

using multiple sets of laser devices to emit the laser of different wavelengths in a synchronous and same-path manner;

using a receiving telescope to receive an echo signal after the laser of different wavelengths interacts with the atmosphere, where the receiving telescope is symmetrically provided with a plurality of pupils; and calculating atmosphere data parameters in respective through the received echo signal.

The synchronous and same-path detection for a plurality of data parameters may be implemented in the present disclosure.

Other features and advantages of the present disclosure will be explained in the following specification, and some will be apparent in the specification or be understood through implementing the present disclosure. The purpose and other advantages of the present disclosure may be implemented and obtained through the structure pointed out in the specification, claims and drawings.

BRIEF DESCRIPTION OF THE DRAWINGS

To better clarify the embodiment of the present disclosure or the technical solution in the prior art, the drawings required to illustrate the embodiments or the prior art will be simply described below. It is apparent that the drawings described below are merely some embodiments recorded in the present disclosure. Those ordinarily skilled in the art can obtain other drawings according to these drawings without contributing creative labor on the basis of those drawings.

DETAILED DESCRIPTION OF THE EMBODIMENTS

In order to make the objectives, technical solution and advantages of the present disclosure clearer, the technical solutions in the embodiments of the present disclosure are clearly and completely elaborated below in combination with the drawings. It is apparent that the described embodiments are a part of the embodiments of the present disclosure but not all. Based on the embodiments of the present disclosure, all the other embodiments obtained by those of ordinary skill in the art on the premise of not contributing creative effort should belong to the protection scope of the present disclosure.

Figure 1:
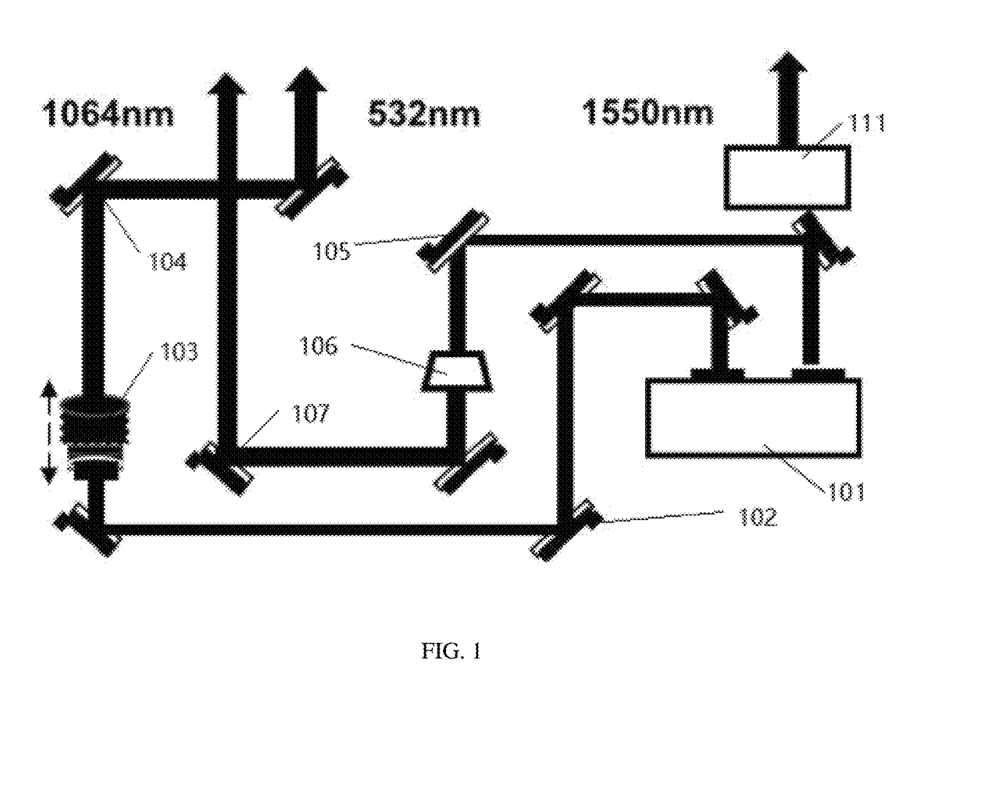
FIG. 1 shows a schematic diagram of an emission unit in a same-path and synchronous detection system for atmosphere data in embodiments according to the present disclosure.
Figure 2:
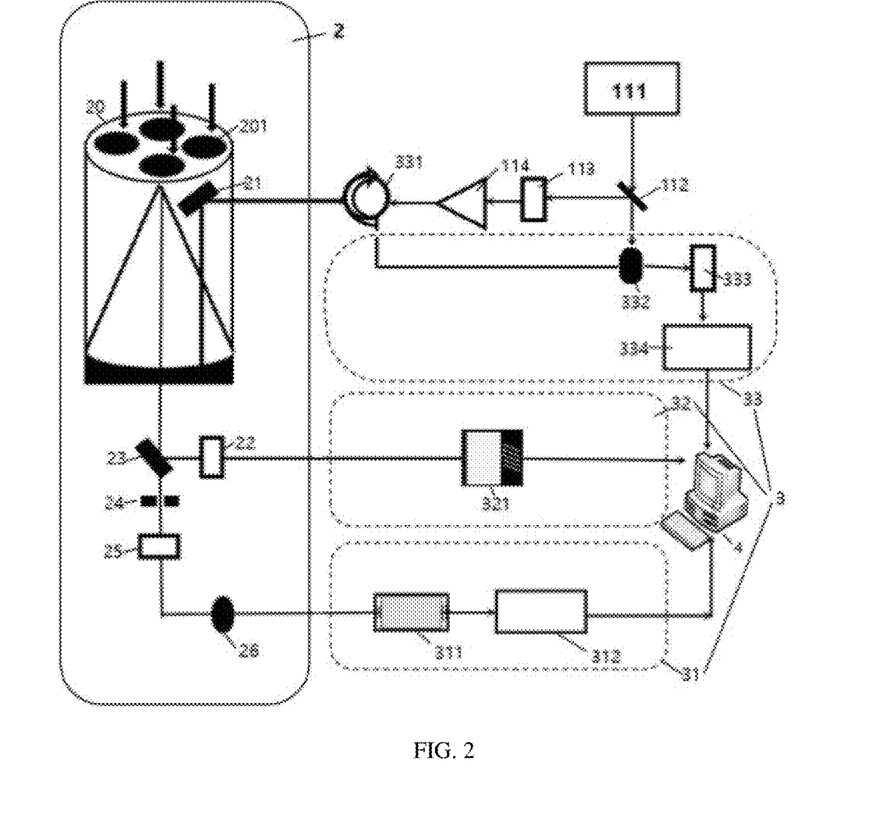
FIG. 2 shows a schematic diagram of a receiving unit and a data processing unit in a same-path and synchronous detection system for atmosphere data in embodiments according to the present disclosure.
Figure 3:
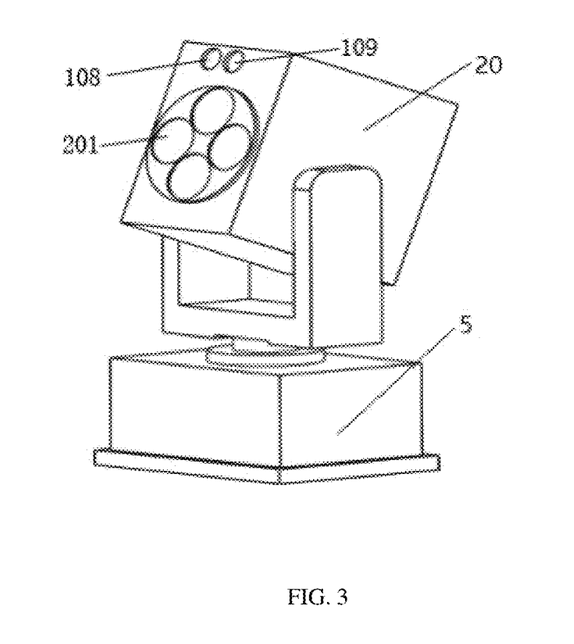
FIG. 3 shows a structure schematic diagram of a same-path and synchronous detection system for atmosphere data in embodiments according to the present disclosure.

The present disclosure provides a same-path and synchronous detection system for atmosphere data, as shown in FIG. 1 to FIG. 3, the detection system includes an emission unit 1, a receiving unit 2 and a data processing unit 3.

The emission unit 1 includes multiple sets of laser devices, which are used for emitting the laser of different wavelengths in a synchronous and same-path manner; and two laser devices are taken as an example in this embodiment.

The receiving unit 2 includes a receiving telescope 20, which is symmetrically provided with a plurality of pupils 201, to receive an echo signal after the laser of different wavelengths interacts with the atmosphere; and the data processing unit 3 is configured to calculate atmosphere data parameters through the echo signal.

The emission unit 1, receiving unit 2 and data processing unit 3 are described in detail below, respectively.

The two laser devices of the emission unit 1 emit the laser beam of different wavelengths in a synchronous and same-path manner, and the laser beam of different wavelengths generates different echo signals after interacting with particles in the atmosphere. Since the receiving telescope 20 is provided with a plurality of pupils 201, different pupils 201 receive the different echo signals. Different pupils 201 transmit the echo signals to the data processing unit 3 after receiving the different echo signals, and the data processing unit 3 finally obtains a plurality of atmosphere data parameters through the different echo signals and different processing modes. In this embodiment, the two laser devices in the emission unit 1 perform the synchronous and same-path emission, the different pupils 201 of the receiving telescope 20 receive the echo signals simultaneously, and a plurality of detection channels of the data processing unit 3 process the echo signals simultaneously to obtain the atmosphere data parameters. Thus, it can be seen that the same-path and synchronous detection for the atmosphere data parameters can be implemented in this embodiment, to maximally ensure to obtain various atmosphere parameters at the same moment.

The two laser devices are separately a first laser device 101 and a second laser device 111, the first laser device 101 is fixed above the receiving telescope 20, to emit lasers of a first fundamental frequency of a first setting wavelength and a corresponding doubled frequency in a synchronous and same-path manner, and a laser output end of the first laser device 101 is sequentially provided with a plurality of total reflectors and beam expanders; specifically, on an optical path of the first fundamental frequency, the laser emitted by the first laser device 101 passes through the plurality of total reflectors and a first beam expander 103, a light beam of the first fundamental frequency with a wavelength as the first setting wavelength is output, and a second beam expander 106 is a fixed multiple for beam expansion and collimation. On the optical path of the doubled frequency, the laser emitted by the first laser device 101 passes through the plurality of total reflectors and the first beam expander 103, the second beam expander 106 is a spiral and adjustable beam expander for beam expansion and focusing, and the light beam of the doubled frequency with a wavelength as the first setting wavelength is output. The whole second laser device 111 is mounted below the receiving telescope 20, to emit the laser of a second fundamental frequency of a second setting wavelength with the first laser device 101 in a synchronous and collimation manner.

Exemplarily, the first laser device 101 is a set of Nd:YAG laser device with seed injection frequency stabilization and equipped with power control and temperature control, and the second laser device 111 is a set of pulsed erbium-doped fiber laser device. The Nd:YAG laser device emits the lasers of 1064 nm of fundamental frequency and 532 nm of doubled frequency simultaneously, and the pulsed erbium-doped fiber laser device emits the laser of 1550 nm in a collimation manner.

Specifically, to ensure the synchronous optical path and parallel emission of the pulsed erbium-doped fiber laser device and the Nd:YAG laser device, the emission optical path of the pulsed erbium-doped fiber laser device adopts an off-axis emission. To ensure that the receiving telescope 20 can receive more echo signals, an emergent laser keeps parallel to an optical axis of the receiving telescope 20.

Exemplarily, the Nd:YAG laser device emits the lasers of 1064 nm of fundamental frequency and 532 nm of doubled frequency simultaneously. After the two beams of laser enter the beam expander for beam expansion through the total reflectors, the emergent laser of the fundamental frequency with a wavelength of 1064 nm detects the atmospheric transmittance to meet that a divergence angle of the emergent laser is less than ½ of a receiving field angle and to implement higher detection requirements, twice of beam expansion and collimation is designed to be used for emission, the divergence angle of the emergent laser is compressed to 0.25 mrad, and 532 nm of detection atmospheric coherence length adopts ten times of beam expansion and focusing for emission. Exemplarily, as shown in FIG. 1, for the two optical paths of the first laser device 101, specifically, on the optical path of the first fundamental frequency, the 1064 nm of laser is vertically emitted to the atmosphere through the fourth total reflector 107 after entering the second beam expander 106 for beam expansion through the third total reflector 105, adjusting the third total reflector 105 enables the laser to enter the second beam expander 106 completely to implement twice beam expansion of the laser and reduce the emission angle, and adjusting the fourth total reflector 107 enables the emission optical axis to be parallel to the main axis of the receiving telescope 20. On the doubled-frequency optical path of the first fundamental frequency, the total reflectors include a first total reflector 102 and a second total reflector 104, where the laser emitted by the first laser device 101 is vertically emitted to the atmosphere through the second total reflector 104 after entering the first beam expander 103 for beam expansion through the first total reflector 102. Adjusting the first total reflector 102 enables the laser to enter the first beam expander 103 completely to implement ten times of beam expansion of the laser and reduce the emission angle, and adjusting the second total reflector 104 enables the emission optical axis to be parallel to the main axis of the receiving telescope 20. It is to be noted that the first total reflector 102, the second total reflector 104, the third total reflector 105 and the fourth total reflector 107 may select a plurality of total reflectors for combination according to demands, and for example, the first total reflector 102 is composed of three total reflectors with the same attribute.

Exemplarily, the 1550 nm wavelength emitted by the second laser device 111 enters the receiving telescope 20 for emission by a beam splitting mirror 112, an acoustic optical modulator 113, an amplifier 114 and a circulator 331 sequentially, to be the same as the receiving optical path.

Since the received three wavelengths have a great span, to receive more echo signals, the whole receiving unit 2 is a Cassegrain reflective structure, which is symmetrically provided with four pupils 201 including an upper pupil, a lower pupil, a left pupil and a right pupil in upper, lower, left and right directions, and the spacing among the pupils 201 is greater than twice of the pupil diameter. A left emergent hole 108 and a right emergent hole 109 are correspondingly provided on left and right sides of the plane where the four pupils 201 are located, the left emergent hole 108 emits the laser with the wavelength of 1064 nm while the right emergent hole 109 emits the laser with a wavelength of 532 nm, and the right emergent hole 109 is provided on a midpoint line that is perpendicular to a connecting line of the left and right pupils.

Specifically, the upper pupil is configured to receive a back scattering space optical signal, generated after the interaction of the pulsed laser of the first fundamental frequency with atmospheric molecules and aerosol particles, hereinafter referred to as an echo signal; the left pupil and the right pupil are configured to receive the echo signal, generated after the interaction of the doubled frequency laser corresponding to the first fundamental frequency with the atmospheric molecules and aerosol particles; and the lower pupil is configured to receive the echo signal with the wind field information, generated after the interaction of the pulsed laser of the second fundamental frequency with the atmosphere.

Exemplarily, the echo signal, generated after the interaction of the laser of a wavelength of 1064 nm with the atmospheric molecules and the aerosol particles, is received by the upper pupil, the upper pupil includes a main mirror, a secondary mirror, a deflecting mirror, a diaphragm, an eyepiece, an optical filter and a converging lens that are sequentially arranged, finally the echo signal is detected by avalanche photo diode (APD), and then the atmospheric transmittance information of different distances is obtained by the data processing unit and in combination with the inversion algorithm. Wedge mirrors are placed at the left and right pupils, the echo signal, generated after the interaction of the laser of a wavelength of 532 nm with the atmospheric molecules and the aerosol particles, is received, the two light spots are spaced from each other, and two light spot signals are separately received by using the main mirror and the secondary mirror of the Cassegrain system. After passing through the reflector, the optical filter and other subsequent optical paths in turn, the light spot signals are transmitted to the target surface of the ICCD camera for imaging, and finally the data processing unit implements the measurement for the atmospheric coherence length according to the image. After 1550 nm laser, emitted by the pulsed erbium-doped fiber laser device, interacts with the atmosphere, the echo signal is received by the lower pupil, passes through the main mirror and the reflector of the receiving telescope in turn and is introduced into the optical fiber, to implement the measurement for the atmospheric wind field. Preferably, since a focal length of the calculating system has a great difference with that of the atmospheric transmittance system, to ensure the simultaneous receiving for the echo signal and convenient integrated structure of the receiving telescope, the mirror lens 21 is mounted in the lower pupil to change the direction of the optical path.

Exemplarily, the receiving unit 2 includes an optical receiving unit and a subsequent light splitting unit. The optical receiving unit consists of the receiving telescope 20 and the mirror lens 21, and the subsequent light splitting unit includes a second optical filter 22, a beam splitting mirror 23, a small-aperture diaphragm 24, a first optical filter 25 and a convergent lens 26. The optical axis of the optical receiving unit is along a vertical direction, and the optical axis of the subsequent light splitting unit is along a horizontal direction and a vertical direction via the beam splitting mirror 23.

The 1064 nm mie scattering signal passes through the receiving telescope 20, the small-aperture diaphragm 24, the first optical filter 25 and the convergent lens 26 along the optical path, a focus of the convergent lens 26 coincides with that of the receiving telescope 20, after converged into a parallel light, the atmospheric back scattering light received by the receiving telescope 20 is introduced into the first APD detector 311 again, the 532 nm mie scattering signal is introduced to the second ICCD detector 321 through the optical filter, and the 1550 nm mie scattering signal is transmitted to the balance detector 333 after being introduced to the optical fiber coupler 332 through the circulator 331.

The data processing unit includes an atmospheric transmittance detection channel 31, an atmospheric coherence length detection channel 32 and an atmospheric wind field detection channel 33.

The atmospheric transmittance detection channel 31 includes a first APD detector 311 and a first data collector 312, the first APD detector 311 is configured to convert a back scattering space optical signal, generated after the interaction of the first fundamental frequency laser with atmospheric molecules and aerosol particles, into an electrical signal, and the first data collector 312 is configured to collect the electrical signal.

The atmospheric coherence length detection channel 32 includes a beam splitting mirror 23, a second optical filter 22 and a second ICCD detector 321, the beam splitting mirror 23 and the second optical filter 22 are configured to transmit the received echo signal to a target surface of the second ICCD detector 321, and the second ICCD detector 321 is configured to convert the echo signal into a digital signal.

The atmospheric wind field detection channel 33 includes a circulator 331, an optical fiber coupler 332, a balance detector 333 and a second data collector 334, the circulator 331 is configured to output the echo signal to the optical fiber coupler 332, the optical fiber coupler 332 is configured to perform beam splitting after the echo signal is in beat frequency with another circuit of local oscillator light, the balance detector 333 is configured to convert the optical signal into the electrical signal, and the second data collector 334 is configured to convert the electrical signal into the digital signal.

Exemplarily, after the echo signal, generated by the interaction of the laser with a wavelength of 1064 nm and the atmospheric molecules, enters the atmospheric transmittance detection channel 31, the mie scattering echo signal of any slant path is obtained via a photovoltaic conversion of the first ICCD detector 311, the first data collector 312 performs a continuous collection to obtain the echo signal of different heights after obtaining the trigger signal of the laser device, and the atmospheric transmittance parameter is output after an inversion calculation.

In the atmospheric coherence length detection channel 32, after the second ICCD detector 321 receives the echo signal generated by the interaction of the 532 nm laser and the atmospheric molecules, the received echo optical signal is transmitted to the target surface of the second ICCD detector 321 through the beam splitting mirror 23, the second optical filter 22 and the subsequent optical paths. The trigger signal is output by the Q-switch of the laser device, to trigger the second ICCD detector 321 to work, then the trigger signal is converted into the digital signal to form a light spot image, which is transmitted to the computer 4, to implement the measurement of the atmospheric coherence length.

After being introduced to the optical fiber, the back scattering space optical signal with the wind field information, generated by the interaction of the pulsed laser with a wavelength of 1550 nm and the atmosphere, is transmitted to the atmospheric wind field detection channel 33, then the back scattering space optical signal is output to the optical fiber coupler 332 through the circulator 331, the beat frequency with the local oscillator light from the Nd:YAG laser device under the drive of the card pulse signal of the external trigger signal is subjected to beam splitting according to 50/50, the beam-split optical signal is converted into the electrical signal through the balance detector 333, the digital signal is output after the electric signal is subjected to the A/D conversion of the second data collector 334, and a signal power spectrum is obtained through the FFT. Finally, a discrete power spectrum peak frequency in a range of 80±50 MHz is obtained through a pulse accumulation, and after subtracting an intermediate frequency signal 80 MHz in the acoustic optical modulator (AOM), an output wind velocity is calculated by using a formula inversion.

Further, the detection system further includes a calculating unit 4 and a scanning platform 5.

The calculating unit 4 is used for calculating the data of three channels and obtain the corresponding result, when receiving and processing the data output from the atmospheric transmittance detection channel 31, the calculating unit 4 acquires the data collector 312 to calculate the atmospheric transmittance; when receiving and processing the digital signal transmitted by the atmospheric coherence length detection channel 32, the calculating unit 4 may implement the measurement for the atmospheric coherence length; and when receiving and processing the digital signal from the atmospheric wind field detection channel 33, the calculating unit 4 calculates the output wind velocity by using the formula inversion after the digital signal obtains the signal power spectrum through FFT.

The scanning platform 5 includes a main control panel and a driver, the driver is configured to control scanning parameters of the emission unit and the receiving unit 2 according to instructions of the main control panel, and the scanning parameters include an azimuth angle, a pitch angle, a speed and a step size. Specifically, the scanning platform is mainly composed of a main control panel and a motor driver. The positioning for the main device and the stable control for the scanning and detection process may be implemented. The scanning and detection mode includes three types of velocity azimuth display (VAD) scanning, precise pixel interpolation (PPI) scanning and range-height indicator (RHI) scanning. The scanning parameters such as an azimuth angle, a pitch angle, a speed and a step size are controlled by adopting a photoelectric (absolute) encoder, to implement the positioning, presetting, scanning, cruising and other functions of a turntable. For omnibearing 0°-360° scanning and pitching 0°-90° scanning, the positioning precision may reach ±0.03°, and while ensuring the precision, different atmospheric detection and scanning modes on the formulated path can be met.

Further, the detection system further includes a control unit, the control unit is configured to trigger multiple sets of laser devices simultaneously to generate a laser pulse, and synchronously trigger the atmospheric transmittance detection channel 31, the atmospheric coherence length detection channel 32 and the atmospheric wind field detection channel 33 for synchronous and same-path data collection, storage and inversion.

Specifically, the control unit implements the comprehensive control, data acquisition and information processing to the whole system: first, two laser devices are triggered simultaneously to generate laser pulses, and three receiving detection channels are triggered synchronously for simultaneous and same-path data collection, storage and inversion, thereby displaying the atmospheric transmittance, atmospheric coherence length and atmospheric wind field in real time. Second, the scanning and detection process may be controlled stably and reliably.

In this embodiment, the two laser devices are designed to emit the optical path, integrally receive the telescope and couple and receive the optical fiber and space light at the same time, a multi-sensor fusion technology is adopted, that is, APD is used to detect the atmospheric transmittance, ICCD is used to detect the atmospheric coherence length, and the balance detector is used to detect the atmospheric wind field, to implement the multi-parameter, simultaneous and same-path detection and improve the efficiency. The system hardware is in a modular design, and the whole structure is compact, small in volume and may be in overall pitch and azimuth movement without changing the internal optical structure. The scanning platform may implement the stable and reliable scanning for any path. With a simple overall structure, high degree of operation automation and good long-term stability, the system may implement the multi-parameter, simultaneous, stable and all-day detection.

Further, as shown in FIG. 2, the receiving telescope adopts an off-axis and an integrated box structure, and the other part encapsulates the data processing unit. The system is compact in structure, small in volume and may be in overall pitch and azimuth movement without changing the internal optical structure; the box encapsulating structure functions in avoiding the laser emission light and the sky background light interfering the receiving of the signal light, and meanwhile effectively preventing the dust from polluting internal optical components. The optical receiving telescope adopts the Cassegrain reflective structure. The coherent wind measurement adopts an off-off-axis structure with the same transceiver.

Another embodiment of the present disclosure further provides a same-path and synchronous detection method for atmosphere data, and the detection method includes the following steps:

using multiple sets of laser devices to emit the laser of different wavelengths in a synchronous and same-path manner;

using a receiving telescope to receive an echo signal after the laser of different wavelengths interacts with the atmosphere, where the receiving telescope is symmetrically provided with a plurality of pupils; and calculating atmosphere data parameters in respective through the received echo signal.

Although the present disclosure is described in detail with reference to the above embodiments. Those of ordinary skill in the art should understand that they can still make modifications to the technical solution recorded in the above embodiments, or make equivalent replacements to part of technical characteristics. However, these modifications or replacement do not separate the nature of the corresponding technical solution from the scope of the technical solution of various embodiments of the present disclosure.

What is claimed is:

1. A same-path and synchronous detection system for atmosphere data, wherein the detection system comprises an emission unit, a receiving unit and a data processing unit;

the emission unit comprises multiple sets of laser devices, which are used for emitting the laser of different wavelengths in a synchronous and same-path manner;

the receiving unit comprises a receiving telescope, which is symmetrically provided with a plurality of pupils, to receive an echo signal after the laser of different wavelengths interacts with the atmosphere;

the data processing unit is configured to calculate atmosphere data parameters through the echo signal;

the laser devices comprise a first laser device and a second laser device;

the first laser device is fixed above the receiving telescope, to emit lasers of a first fundamental frequency of a first setting wavelength and a corresponding doubled frequency in a synchronous and same-path manner, and a front end of the first laser device is sequentially provided with a total reflector and a beam expander;

the whole second laser device is mounted below the receiving telescope, to emit the laser of a second fundamental frequency of a second setting wavelength with the first laser device in a synchronous and collimation manner;

the data processing unit comprises an atmospheric transmittance detection channel, an atmospheric coherence length detection channel and an atmospheric wind field detection channel;

the atmospheric transmittance detection channel comprises a first avalanche photo diode (APD) detector and a first data collector, the first APD detector is configured to convert a back scattering space optical signal, generated after the interaction of the first fundamental frequency laser with atmospheric molecules and aerosol particles, into an electrical signal, and the first data collector is configured to collect the electrical signal;

the atmospheric coherence length detection channel comprises a reflector, a second optical filter and a second intensified charge coupled device (ICCD) detector, the reflector and the second optical filter are configured to transmit the received echo signal to a target surface of the second ICCD detector, and the second ICCD detector is configured to convert the echo signal into a digital signal; and the atmospheric wind field detection channel comprises a circulator, an optical fiber coupler, a balance detector and a second data collector, the circulator is configured to output the echo signal to the optical fiber coupler, the optical fiber coupler is configured to perform beam splitting after the echo signal is in beat frequency with another circuit of local oscillator light, the balance detector is configured to convert the optical signal into the electrical signal, and the second data collector is configured to convert the electrical signal into the digital signal.

2. The same-path and synchronous detection system for the atmosphere data according to claim 1, wherein
an emitting optical path of the second laser device adopts an off-axis emission and is the same as a receiving optical path; and
an emergent laser keeps parallel to an optical axis of the receiving telescope.

3. The same-path and synchronous detection system for the atmosphere data according to claim 1, wherein
the emergent laser of the first fundamental frequency is emitted in a beam-expanding and collimation manner; and
the emergent laser of the corresponding doubled-frequency laser is emitted in a beam-expanding and focusing manner.

4. The same-path and synchronous detection system for the atmosphere data according to claim 1, wherein
the whole receiving unit is a Cassegrain reflective structure, which is provided with an upper pupil, a lower pupil, a left pupil and a right pupil in upper, lower, left and right directions, and the spacing between very two pupils is greater than twice of the pupil diameter.

5. The same-path and synchronous detection system for the atmosphere data according to claim 4, wherein
a left emergent hole and a right emergent hole are correspondingly provided on left and right sides of the plane where the four pupils are located, the left emergent hole emits the emergent laser of the first fundamental frequency while the right emergent hole emits the corresponding doubled-frequency laser, and the right emergent hole is provided on a midpoint line that is perpendicular to a connecting line of the left and right pupils.

6. The same-path and synchronous detection system for the atmosphere data according to claim 1, wherein
the detection system further comprises a calculating unit;
when receiving and processing the data output from the atmospheric transmittance detection channel, the calculating unit acquires the data collector to calculate the atmospheric transmittance; when receiving and processing the digital signal transmitted by the atmospheric coherence length detection channel, the calculating unit implements the measurement for the atmospheric coherence length; and when receiving and processing the digital signal from the atmospheric wind field detection channel, the calculating unit calculates an output wind velocity by using a formula inversion after the digital signal obtains a signal power spectrum through a fast fourier transform (FFT).

7. The same-path and synchronous detection system for the atmosphere data according to claim 1, wherein
the detection system further comprises a scanning platform and a control unit;
the scanning platform comprises a main control panel and a driver, the driver is configured to control scanning parameters of the emission unit and the receiving unit according to instructions of the main control panel, and the scanning parameters comprise an azimuth angle, a pitch angle, a speed and a step size; and
the control unit is configured to trigger multiple sets of laser devices simultaneously to generate a laser pulse, and synchronously trigger the atmospheric transmittance detection channel, the atmospheric coherence length detection channel and the atmospheric wind field detection channel for synchronous and same-path data collection, storage and inversion.

8. A same-path and synchronous detection method for atmosphere data, wherein the detection method comprises the following steps:
using multiple sets of laser devices to emit the laser of different wavelengths in a synchronous and same-path manner;
wherein the laser devices comprise a first laser device and a second laser device;
a receiving telescope is configured to receive an echo signal after the laser of different wavelengths interacts with the atmosphere, and the receiving telescope is symmetrically provided with a plurality of pupils;
the first laser device is fixed above the receiving telescope, to emit lasers of a first fundamental frequency of a first setting wavelength and a corresponding doubled frequency in a synchronous and same-path manner, and a front end of the first laser device is sequentially provided with a total reflector and a beam expander;
the whole second laser device is mounted below the receiving telescope, to emit the laser of a second fundamental frequency of a second setting wavelength with the first laser device in a synchronous and collimation manner;

the data processing unit comprises an atmospheric transmittance detection channel, an atmospheric coherence length detection channel and an atmospheric wind field detection channel;

the atmospheric transmittance detection channel comprises a first APD detector and a first data collector, the first APD detector is configured to convert a back scattering space optical signal, generated after the interaction of the first fundamental frequency laser with atmospheric molecules and aerosol particles, into an electrical signal, and the first data collector is configured to collect the electrical signal;

the atmospheric coherence length detection channel comprises a reflector, a second optical filter and a second ICCD detector, the reflector and the second optical filter are configured to transmit the received echo signal to a target surface of the second ICCD detector, and the second ICCD detector is configured to convert the echo signal into a digital signal; and the atmospheric wind field detection channel comprises a circulator, an optical fiber coupler, a balance detector and a second data collector, the circulator is configured to output the echo signal to the optical fiber coupler, the optical fiber coupler is configured to perform beam splitting after the echo signal is in beat frequency with another circuit of local oscillator light, the balance detector is configured to convert the optical signal into the electrical signal, and the second data collector is configured to convert the electrical signal into the digital signal.

* * * * *